United States Patent
Wirth, Jr. et al.

(10) Patent No.: US 7,845,598 B2
(45) Date of Patent: Dec. 7, 2010

(54) PIPE BRACKETS AND PIPE HANGING SYSTEM

(75) Inventors: John Wirth, Jr., Dubois, WY (US); Jay L. Sanger, Casper, WY (US); Paul Brutsman, Casper, WY (US); Dan Stoops, Casper, WY (US); Mark K. McCool, Casper, WY (US)

(73) Assignee: Woodworker's Supply, Inc., Casper, WY (US)

( * ) Notice: Subject to any disclaimer, the term of this patent is extended or adjusted under 35 U.S.C. 154(b) by 0 days.

(21) Appl. No.: 12/003,213

(22) Filed: Dec. 20, 2007

(65) Prior Publication Data

US 2008/0099634 A1    May 1, 2008

Related U.S. Application Data

(62) Division of application No. 11/143,939, filed on Jun. 3, 2005, now Pat. No. 7,331,549.

(51) Int. Cl.
*F16L 3/22* (2006.01)
*F16L 3/08* (2006.01)

(52) U.S. Cl. .................. 248/68.1; 248/74.1; 248/74.3; 248/74.4

(58) Field of Classification Search ............... 248/49, 248/55, 58, 59, 62, 65, 66, 68.1, 74.3, 74.4, 248/512, 523, 534, 48.2, 69, 74.1; 138/106–108
See application file for complete search history.

(56) References Cited

U.S. PATENT DOCUMENTS

| | | | |
|---|---|---|---|
| 3,539,137 A * | 11/1970 | March ........................ | 248/62 |
| 3,730,228 A | 5/1973 | Gibbs, Sr. | |
| 3,809,348 A | 5/1974 | DiLaura | |
| D276,134 S | 10/1984 | Ericsson | |
| 4,783,030 A * | 11/1988 | Buerhop ..................... | 248/74.4 |
| 4,884,528 A | 12/1989 | Steudler, Jr. | |
| 5,833,179 A | 11/1998 | Vandenberg | |
| 5,906,341 A | 5/1999 | Brown | |
| 5,961,081 A | 10/1999 | Rinderer | |
| 6,073,891 A | 6/2000 | Humber | |
| 6,076,778 A | 6/2000 | Brown | |
| 6,164,604 A * | 12/2000 | Cirino et al. ............... | 248/74.3 |
| 6,206,613 B1 | 3/2001 | Elkins | |
| 6,464,182 B1 | 10/2002 | Snyder | |
| 6,467,734 B1 | 10/2002 | Brown et al. | |
| 6,666,415 B2 | 12/2003 | Hansen | |
| 6,799,607 B1 * | 10/2004 | Friedline et al. ........... | 138/106 |

(Continued)

*Primary Examiner*—Tan Le
(74) *Attorney, Agent, or Firm*—Nixon & Vanderhye PC

(57) ABSTRACT

A method of installing a piping system, including applying mark(s) to a surface along a line parallel to a desired center line of the piping system; selecting a plurality of pipe mounting brackets, each pipe mounting bracket including a mounting portion and a pipe supporting portion projecting from said mounting portion and including an arm portion having a generally arched surface sized and extending to support at least a portion of an outer circumferential surface of a pipe and thereby defining a pipe receiving receptacle. Each mounting portion includes a predetermined, indicator part disposed at a predetermined lateral and vertical position with respect to a radial center of a circular part of the arched surface of the respective bracket. The indicator part of each selected bracket is aligned with the mark(s) and the mounting portion of the bracket is fastened to the surface with the fastener.

16 Claims, 5 Drawing Sheets

U.S. PATENT DOCUMENTS

| | | | |
|---|---|---|---|
| 7,017,866 B2* | 3/2006 | Whorton | 248/71 |
| 7,207,527 B2* | 4/2007 | Opperthauser | 248/55 |
| 7,207,530 B2 | 4/2007 | Ismert et al. | |
| 7,331,549 B2* | 2/2008 | Wirth et al. | 248/65 |
| 2003/0071174 A1 | 4/2003 | Jager et al. | |
| 2006/0284026 A1 | 12/2006 | Wirth et al. | |

* cited by examiner

PIPE BRACKETS AND PIPE HANGING SYSTEM

This application is a division of application Ser. No. 11/143,939, filed Jun. 3, 2005, now U.S. Pat. No. 7,331,549, the entire contents of which are hereby incorporated by reference in this application.

BACKGROUND OF THE INVENTION

The present invention generally relates to brackets and a hanging system for supporting fluid-carrying ducts or pipes along a wall or suspended from a ceiling of a building structure.

Conventional plumbing and piping systems generally include one or more metal or polyvinylchloride (PVC) pipes which distribute fluids such as water and air to desired locations. It is common for the pipe segments along a pipeline to decrease in diameter in an inflow direction or increase in diameter in an outflow direction, particularly as the flow is distributed or accumulated, respectively, at pipe junctions. Also, it is common for pipes or ducting to be oriented to follow various wall and ceiling surfaces while traversing an area of a building structure.

A variety of clamps and brackets, such as U-shaped brackets and fasteners are known for securing pipe segments along a wall or wall stud. Likewise straps and the like are known for suspending piping from a ceiling or ceiling joists. A problem with some such fasteners is that they hold the outer surface of the pipe against the mounting surface so that, if the pipe diameter changes, the center line of the pipe will not be maintained in a position defining an axial flow path. Moreover, when a pipe is suspended from above by straps, the position of the straps will be imprecise, with the consequence that, again, the pipe may not be supported to define a straight flow path therethrough. If the installer wants to apply brackets, straps or the like so that the flow path through the pipe will be maintained straight, it is difficult for the installer to achieve alone and will require a great deal of planning and measurement in advance.

There are also other problems associated with the fasteners that are commonly used to mount and secure pipes and ducting. For example, installers often feel it is necessary to solder a pipe to a bracket to ensure that it is securely supported by a building wall or ceiling, thus adding extra steps to the installation process and increasing the risk of pipe deterioration at the pipe to bracket junction. In a case of U-shaped brackets or staples, moreover, there is the risk of damage to the pipe when the fastener is secured, it is not possible to reposition or remove the pipe without detachment of the bracket and there is a particular risk of scratching or gouging the pipes, and thus also a risk of premature pipe failure.

SUMMARY OF THE INVENTION

It would therefore be desirable to provide an improved pipe bracket which allows pipes to be quickly, easily and securely positioned and supported horizontally or vertically to a building wall or suspended from a ceiling without having to solder the pipe to the brackets and without scratching or gouging the pipes.

It would also be desirable to provide a pipe bracket that permits metallic and non-metallic pipes to be quickly, easily and firmly secured to a building wall or ceiling without requiring the use of additional parts such as inserts.

It would further be desirable to provide a pipe hanging system comprised of pipe brackets that allow a pipe to be easily mounted in any position, along a wall or ceiling, while providing a constant center line path of each pipe segment irrespective of changes in the diameter of the pipes.

The invention provides pipe brackets and a pipe hanging system that advantageously realizes the above-described objects. More particularly, the invention provides an improved pipe bracket which allows metallic and non-metallic pipes to be quickly, easily and securely positioned and supported horizontally, vertically or suspended from a ceiling and wherein the pipe brackets are sized and configured so that irrespective of diameter changes of the pipe along its length, the piping can be mounted with the center line of the pipe along a constant center line path that is parallel to the surface to which the pipe is mounted.

Thus, the invention may be embodied in a pipe bracket comprising: a mounting portion including a mounting face for being disposed in opposed facing relation to a planar surface and secured thereto with at least one fastener; and a pipe supporting portion projecting from said mounting portion in a plane generally perpendicular to said mounting face and including an arm portion defining a pipe receiving receptacle configured to support at least a portion of an outer circumferential surface of a pipe, the generally arched surface of the arm portion defining said pipe receiving receptacle terminating beyond a point that is diametrically opposed to the mounting portion and beyond a plane that 1) contains a radial center of a circular part of said arched surface, 2) is perpendicular to the plane of the pipe supporting portion and 3) is perpendicular to the mounting face, whereby a pipe can be supported by said pipe receiving receptacle of said arm portion both when the mounting portion is mounted to a vertical surface with the pipe horizontally disposed and when the mounting portion is mounted to an overhead surface to suspend the pipe The invention may also be embodied in a support assembly for supporting a pipe having segments of different diameter comprising: a plurality of mounting brackets, each said mounting bracket comprising: a mounting portion including a mounting face for being disposed in opposed facing relation to a planar surface and secured thereto with at least one fastener; and a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle, wherein at least two said brackets have an arched surface having respectively different radii so as to be respectively adapted to receive a pipe segment of differing diameter from the other, and wherein a radial center of a circular part said arched surface of each said bracket is disposed at a same lateral and vertical position with respect to an predetermined, indicator part of their respective mounting portion.

The invention may further be embodied in a method of installing a piping system, comprising: applying at least one mark to a surface along a line parallel to a desired center line path of a segment of the piping system; selecting a plurality of pipe mounting brackets, each said pipe mounting bracket comprising: a mounting portion including a mounting face for being disposed in opposed facing relation to a planar surface and secured thereto with at least one fastener; and a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle, wherein each said mounting portion includes a predetermined, indicator part disposed at a predetermined lateral and vertical position with respect to a radial center of a circular part said arched surface of said respective bracket; and aligning said indicator part of each said selected bracket with said at least one mark and fastening each said selected bracket to said surface with at least one fastener.

DETAILED DESCRIPTION OF THE INVENTION

Figure 1:
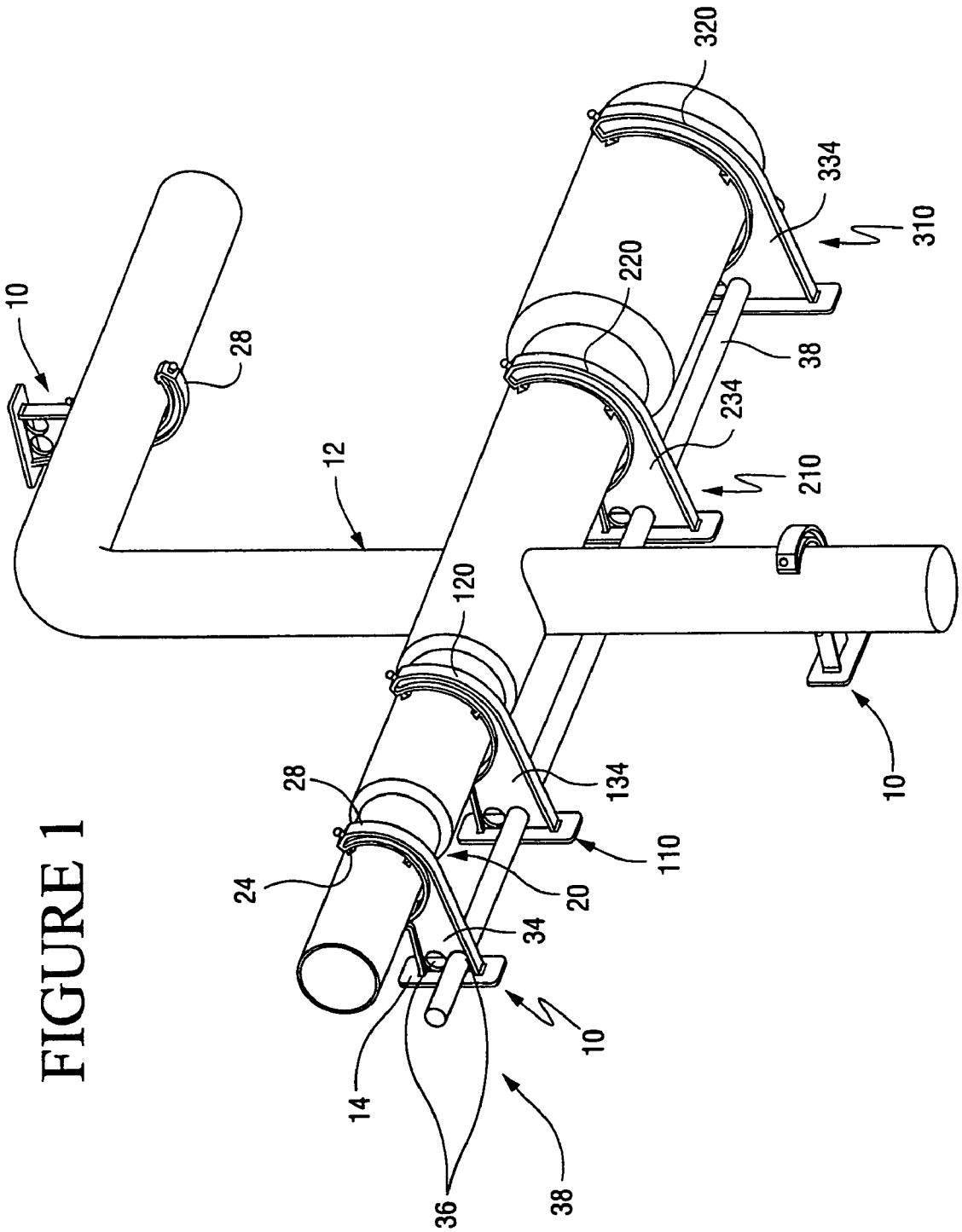
FIG. 1 is a perspective view depicting pipe brackets embodying the invention supporting piping of various diameters, horizontally and vertically to a wall, and suspended from a ceiling, in accordance with an example embodiment of the invention.

The present invention provides a pipe bracket for supporting any generally cylindrical tubular component such as metal or plastic pipes or ducts (hereinafter generically referred to as pipes). The brackets provided in accordance with the invention are respectively configured, as detailed hereinbelow, to receive and support pipes of various predetermined diameters so that even a pipe having segments of varying diameter can be quickly and easily supported with the common centerline of the pipe extending along a desired path. While the brackets provided according to the invention are particularly suited to rigid pipes, they could be used to support flexible pipes as well.

In the illustrated example embodiments, the pipe brackets 10,110,210,310 are pre-formed polycarbonate brackets and are provided in sizes to support 4", 5", 6", or 8" diameter metal snap-lock, PVC and/or polyurethane piping 12 horizontally, vertically or overhead. However, it is to be appreciated that additional bracket sizes can be provided to receive smaller or larger pipes. Also, the brackets could be made of another plastic, or metal, material.

Each bracket includes a mounting portion 14,114,214,314 having a mounting face for being disposed against and secured to a flat support surface, such as a wall or ceiling surface. The mounting portion may have fastener holes pre-formed therein for receiving fastener(s), such as nail(s), bolt(s), or screw(s) to secure the mounting portion to the wall or ceiling. In the alternative, holes may be drilled of a size and in location(s) as deemed necessary or desirable by the end user, depending upon the installation location of the bracket, the weight of the piping component to be supported and the composition of the surface to which the bracket is being secured. In addition or as yet a further alternative, the mounting portion may be secured with a fastener comprising an adhesive material.

Each pipe bracket further includes a pipe supporting portion 18 including an arm portion 20,120,220,320 for engaging to support at least a portion of the outer circumferential surface of the pipe 12. The pipe supporting portion 18 of the mounting bracket 10 extends in a plane perpendicular to the mounting face 16 of the support bracket and the arm portion 20 defines a generally part circular receptacle 22 for receiving the pipe 12. In the illustrated example embodiment spacer support components 26,126,226,326 are defined at spaced locations along the arched or curved surface 24,124,224,324 of the arm portion thereby supporting and spacing the outer circumference surface of the associated pipe from the arched surface of the arm. In the illustrated embodiment, three spacer supports 26,126,226,326 are defined along the arched surface, two supports are approximately 180° apart in opposed facing relation and a third disposed about 90° from each of the first two supports.

The bracket is configured in this example embodiment to support a vertically or horizontally oriented pipe on wall or suspended from the ceiling. Thus, to ensure support particularly for vertically oriented or ceiling supported pipes, the generally arched surface of the arm portion terminates at a free end 28,128,228,328 thereof that is beyond a point that is diametrically opposed to the mounting portion 14,114,214,314 and beyond a plane that 1) contains the radial center of a circular part of the arched surface, 2) is perpendicular to the plane of the pipe supporting portion and 3) is perpendicular to the mounting face. In the illustrated embodiment, the arched surface extends through an arch of at least about 180°. In this way, as illustrated in FIG. 1, when the bracket is mounted to a ceiling, the free end of the arm portion extends beyond the vertical bottom of the pipe supported thereby. In the illustrated example embodiment, the pipe 12 supporting portion is integrally molded with the mounting portion but it is to be understood that the mounting portion and pipe supporting portion(s) could be separately formed and connected by the manufacturer or by the user.

Figure 2:
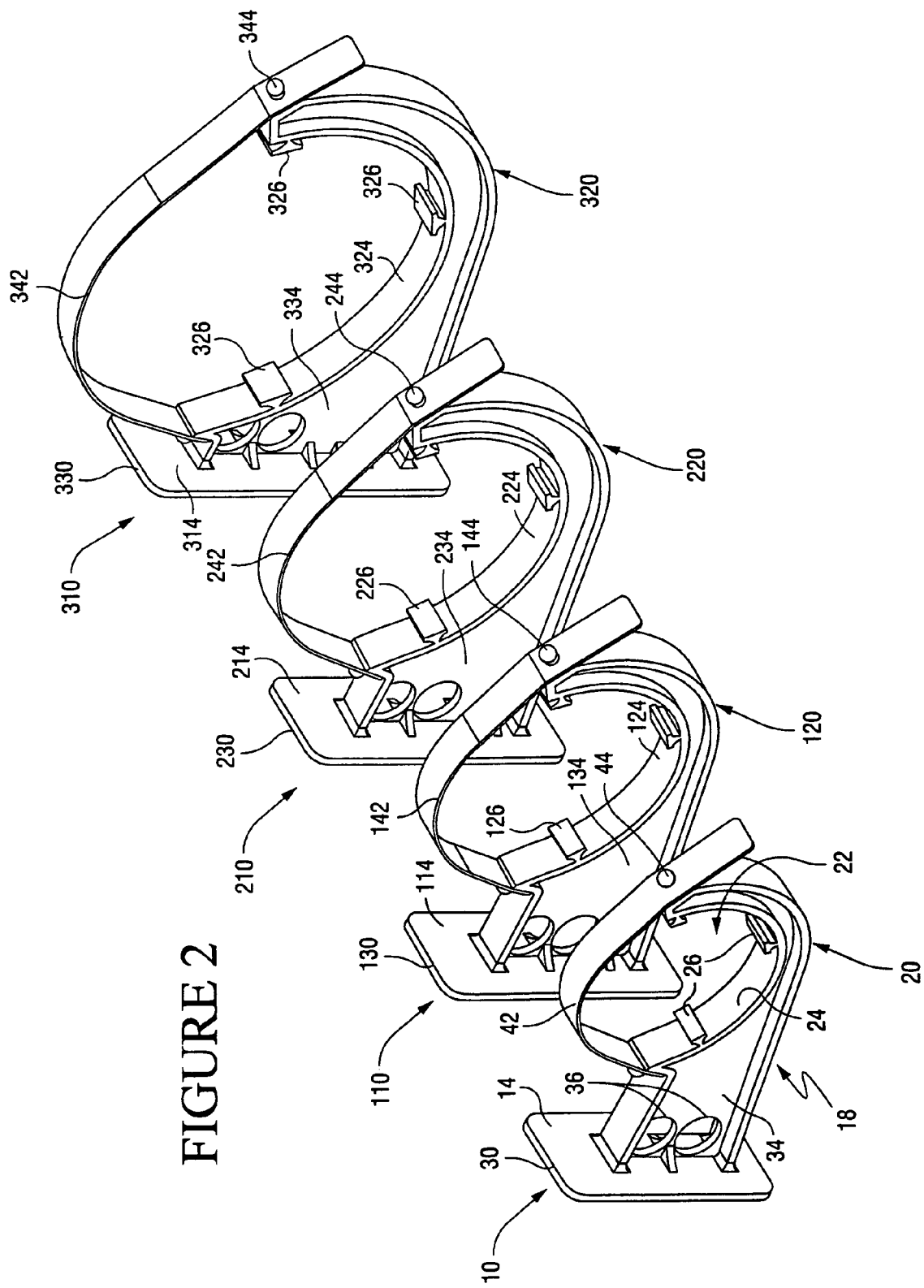
FIG. 2 presents schematic perspective views of pipe brackets embodying the invention and provided in various sizes.
Figure 3:
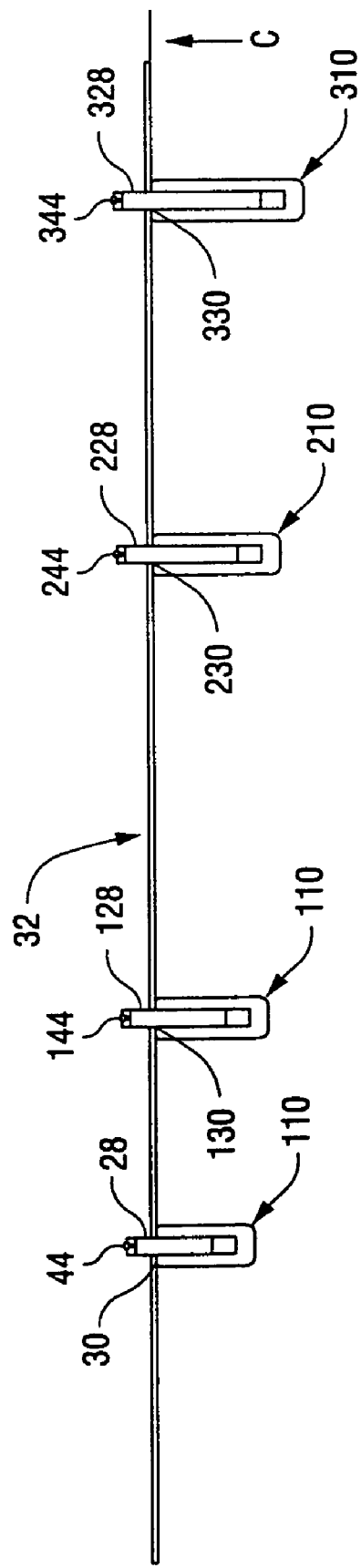
FIG. 3 schematically illustrates brackets of various sizes mounted along a chalk line to provide a common pipe centerline irrespective of piping diameter, according to an example embodiment of the invention.
Figure 4:
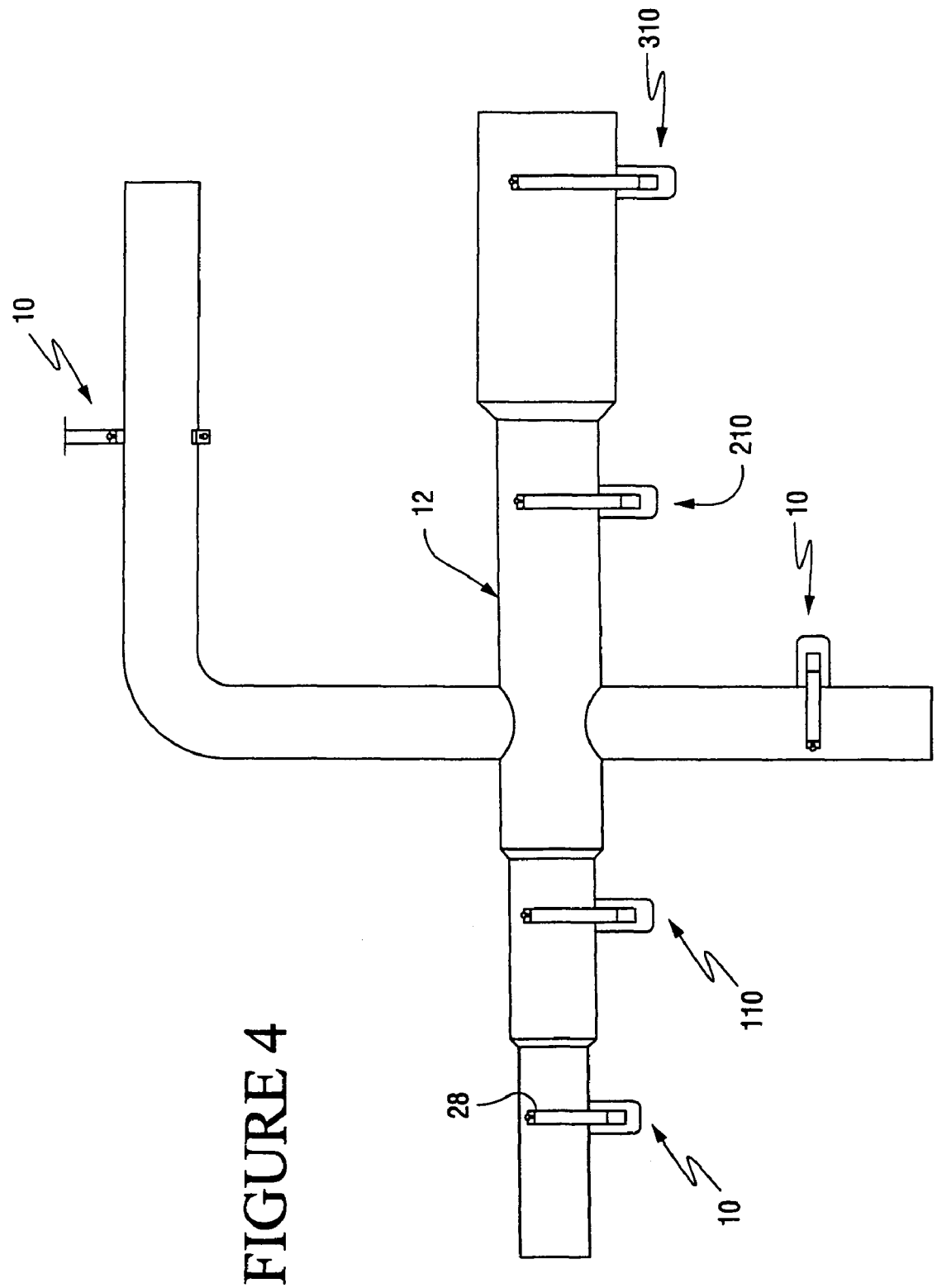
FIG. 4 is a front elevational view of the assembly of FIG. 1.
Figure 5:
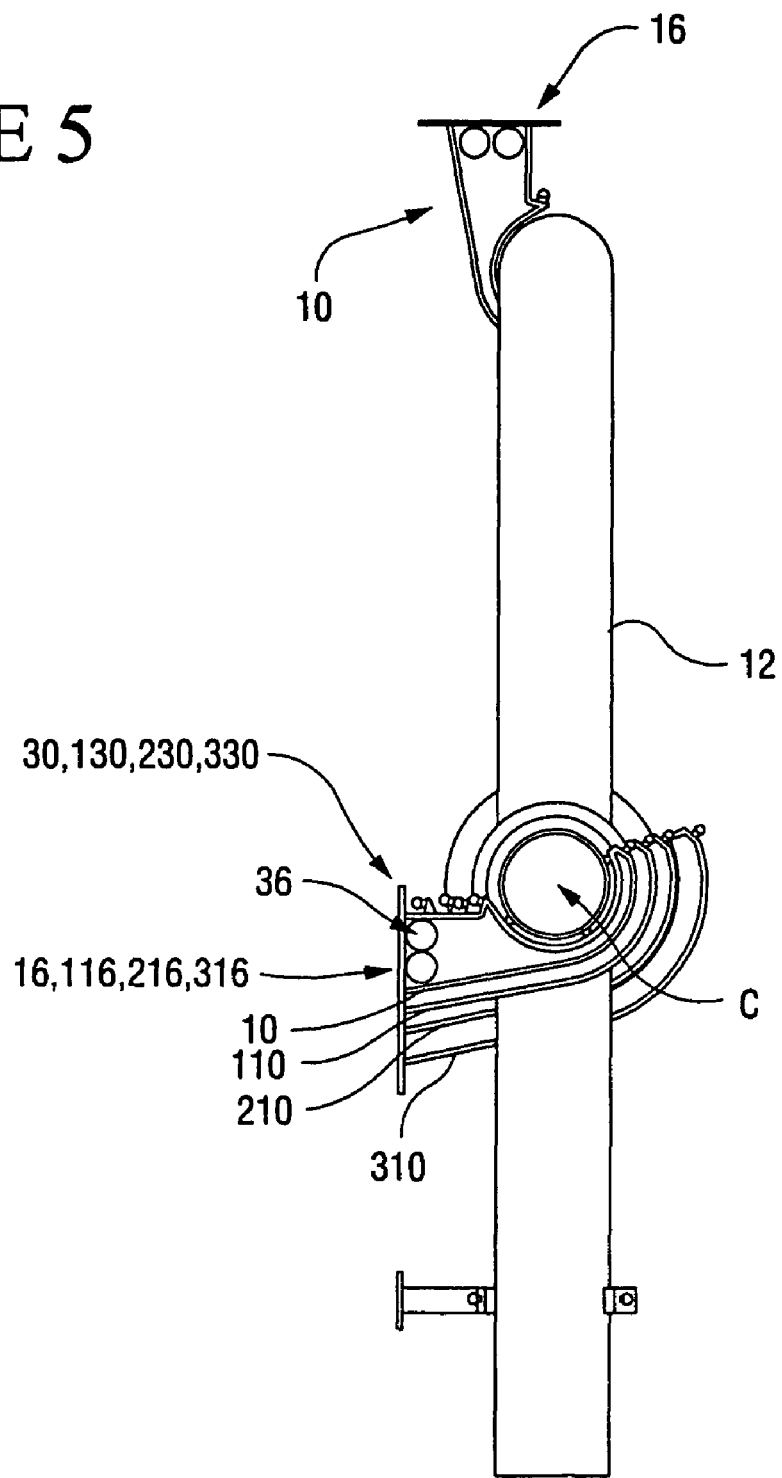
FIG. 5 is an end elevational view of the assembly of FIG. 4.

Referring to FIG. 2, the mounting bracket of the invention is offered in a variety of sizes, but in a presently preferred embodiment, each bracket is characterized in that a radial center of a supported pipe of corresponding size is located at a common, predetermined vertical and lateral position with respect to a predetermined, indicator part 30,130,230,330 of the mounting portion 14,114,214,314 of the respective bracket 10,110,210,310. In this way, by aligning the indicator part of the mounting portion of each of several brackets along a common mounting line 32 (FIG. 3), the supported pipe will be mounted with a constant center line even if the diameter changes along the pipe, so that corresponding but different size brackets are used. In an example embodiment, the indicator part 30,130,230,330 is in the same horizontal plane as the center line C of a pipe that the bracket is sized to receive. In the illustrated example embodiment, the indicator part 30,130,230,330 of the mounting portion of the bracket is the top longitudinal end edge of the mounting portion 14,114,214,314, the term "top" being used for convenience to refer to the longitudinal end edge that is up when the receptacle 22 of the arm portion 20 opens up. It is to be understood, however, that the indicator part of the mounting bracket can be designated by indicia such as a groove or raised bead (not shown) on the mounting portion, provided at a prescribed position vertically and laterally with respect to the radial center of a circular part of the arched surface of the pipe supporting portion, so as to likewise be disposed at a predetermined vertical and lateral position with respect to the centerline of the mounted pipe.

In the illustrated embodiment, a web portion 34,134,234,334 is defined between the arm portion 20 of the pipe supporting portion and the mounting portion 14, the web portion being defined in a plane generally perpendicular to the mounting face 16 of the mounting portion 14 of the bracket. In an example embodiment, at least one hole 36 is defined through the web portion to make it possible to simultaneously feed air and utility lines 38 in parallel to the supported pipe. In the illustrated embodiment, two predrilled holes for such air or utility lines are provided.

As noted above, the arched surface of the arm portion extends through an arch that terminates more than 180° from the mounting portion 14, to support, e.g., ceiling suspended pipes. In the illustrated embodiments, to facilitate placement of the pipe, the inner end portion 40 of the arched surface extends generally straight upwardly and outwardly towards the mounting portion to ensure that the pipe can be seated without difficulty on, e.g., the supports 26 of the arched surface 24. In the alternative, the arched surface can be truncated on the mounting portion side end and spaced from the mounting portion 14 to facilitate pipe placement.

To further ensure that the pipe seated in the receptacle of the arm portion will be retained in the mounting bracket, a strap 42,142,242,342 is advantageously provided to be detachably secured at at least one end thereof to a respective end of the arm portion 20,120,220,320. By way of example, the illustrated strap is formed from vinyl or cloth and includes button hole receptacles (not shown) at its ends. Also, first and second buttons 44,144,244,344 having enlarged heads and reduced diameter neck portion (not shown in detail) are defined at respective ends of the arm portions 20,120,220, 320. Once the pipe is placed in the receptacle, seated on the arched surface, or on the spacer supports when provided, the buttons are respectively inserted through the button holes of the strap of the bracket, to secure the pipe to the arm portion. As an alternative to the illustrated button attachments, snaps, hooks, Velcro-type fastening material, and other similar mechanical fasteners may be provided at either or both ends of the strap. Also, as an alternative, one end of the strap may be more permanently attached to the bracket to avoid loss of the strap before the pipe is mounted and secured.

As will be appreciated from the foregoing, to install a piping system, the user snaps a chalk line or otherwise marks a surface with a line 32 indicating a predetermined offset of the desired center line path C of the pipe. Then, the user drills holes into the brackets, if needed and if not predrilled, to match their application and then secures the appropriately sized mounting brackets to the support surface with fasteners while the indicator parts 30,130,230,330 of the mounting portions 14,114,214,314 are disposed along the common mounting line 32. Once the mounting brackets have been installed, the piping is placed in the mounting brackets and the straps are attached to hold the piping in place. Since each bracket has been designed to follow a common centerline, mounting height can remain constant regardless of piping size. As noted, one or more holes 36 are predrilled through the web portion of the pipe support for added versatility to make it possible to simultaneously feed air and utility lines 38. As will be appreciated, among other advantages, the ease with which the brackets can be positioned to mount a pipeline, even of varying diameter, allows one person to handle overhead installation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of installing a piping system, comprising:
    applying at least one mark to a surface along a line parallel to a desired center line path of a segment of the piping system;
    selecting a plurality of pipe mounting brackets, each said pipe mounting bracket comprising:
        a mounting portion including a mounting face for being disposed in opposed facing relation to a planar surface and secured thereto with at least one fastener; and
        a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle,
        wherein each said mounting portion includes a predetermined, indicator part disposed at a predetermined lateral and vertical position with respect to a radial center of a circular part of said arched surface of said respective bracket; and
    aligning said indicator part of each said selected bracket with said at least one mark and fastening each said selected bracket to said surface with at least one fastener,
    wherein said step of selecting a plurality of pipe mounting brackets comprises selecting at least two pipe mounting brackets having arched surfaces with respectively different radii so as to be respectively adapted to receive a pipe segment of differing diameter from the other, and wherein the radial center of said arched surface of each said bracket is disposed at a same lateral and vertical position with respect to said predetermined, indicator part of their respective mounting portion, so that after the indicator part of each said selected bracket is aligned with the at least one mark and fastened to the surface, the radial center of the arched surface of each said bracket is disposed along a single, common axis that is parallel to the line along which the at least one mark was applied, and, after said aligning and fastening, placing an elongated pipe into the pipe receiving receptacle of each said selected pipe mounting bracket so that said elongated pipe extends between and is supported by said brackets.

2. A method as in claim 1, wherein said indicator part of said mounting bracket is a longitudinal end surface of the mounting portion.

3. A method as in claim 1, wherein said indicator part is a predetermined distance from the horizontal plane of the center line of a pipe that the brackets are respectively sized to receive.

4. A method as in claim 1, wherein said step of selecting a plurality of pipe mounting brackets comprises selecting pipe mounting brackets which further include a plurality of spacer support components disposed at spaced locations along said arched surface for supporting a pipe disposed in said receptacle at spaced locations about an outer circumference thereof.

5. A method as in claim 1, wherein said step of selecting a plurality of pipe mounting brackets comprises selecting a plurality of pipe mounting brackets which further include at least one hole defined through the pipe supporting portion thereof and adapted to receive an air or utility line.

6. A method as in claim 1, wherein said step of selecting a plurality of pipe mounting brackets comprises selecting a plurality of pipe mounting brackets which further include a strap component for bridging an open mouth of said receptacle, at least one end of said strap component being detachably secured to said arm portion.

7. A method as in claim 1, wherein said step of selecting a plurality of pipe mounting brackets comprises selecting a plurality of pipe mounting brackets having said pipe supporting portion of each said pipe bracket integrally formed in one piece with said respective mounting portion.

8. A method as in claim 1, wherein said step of selecting a plurality of said mounting brackets comprises selecting a plurality of pipe mounting brackets wherein the indicator part of each selected mounting bracket is disposed at a same predetermined lateral and vertical distance from the radial center of the circular part of the arched surface of the respective bracket, irrespective of the radii of the arched surface of the selected bracket.

9. A method as in claim 1, wherein said step of aligning and fastening comprises fastening each said selected bracket to said surface so that the radial center of the circular part thereof is disposed along a common axial line that is parallel to said line along which said at least one mark was applied.

10. A method as in claim 1, further comprising, after said aligning and fastening, placing an elongated pipe into the pipe receiving receptacle of each said selected pipe mounting bracket so that said elongated pipe extends between and is supported by said brackets.

11. A method of installing a piping system, comprising:
applying at least one mark to a surface along a line parallel to a desired center line path of a segment of the piping system;
selecting a plurality of pipe mounting brackets, each said pipe mounting bracket comprising:
a mounting portion including a mounting face for being disposed in opposed facing relation to a planar surface and secured thereto with at least one fastener; and
a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle,
wherein each said mounting portion includes a predetermined, indicator part disposed at a predetermined lateral and vertical position with respect to a radial center of a circular part of said arched surface of said respective bracket; and
aligning said indicator part of each said selected bracket with said at least one mark and fastening each said selected bracket to said surface with at least one fastener,
wherein said step of selecting a plurality of pipe mounting brackets comprises selecting a plurality of pipe mounting brackets wherein the arched surface of the arm portion of each bracket terminates at a free end thereof beyond a point that is diametrically opposed to the mounting portion and beyond a plane that 1) contains a radial center of a circular part of said arched surface, 2) is perpendicular to the plane of the pipe supporting portion and 3) is perpendicular to the mounting face, whereby a pipe can be supported by said pipe receiving receptacle of said arm portion both when the mounting portion is mounted to a vertical surface with the pipe horizontally disposed and when the mounting portion is mounted to an overhead surface to suspend the pipe.

12. A method as in claim 11, wherein said step of selecting a plurality of pipe mounting brackets comprises selecting a plurality of pipe mounting brackets wherein each said arched surface extends through an arch of greater than 180°.

13. A method of installing a piping system, comprising:
applying at least one mark to a surface along a line parallel to a desired center line path of a segment of the piping system;
selecting a plurality of pipe mounting brackets, each said pipe mounting bracket comprising:
a mounting portion including a mounting face for being disposed in opposed facing relation to a planar surface and secured thereto with at least one fastener; and
a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle,
wherein each said mounting portion includes a predetermined, indicator part disposed at a predetermined lateral and vertical position with respect to a radial center of a circular part of said arched surface of said respective bracket; and
aligning said indicator part of each said selected bracket with said at least one mark and fastening each said selected bracket to said surface with at least one fastener,
wherein said step of selecting a plurality of pipe mounting brackets includes selecting at least two pipe mounting brackets having an arched surface with respectively different radii so as to be respectively adapted to receive pipe segments of differing diameter from the other,
wherein a radial center of a circular part of said arched surface of each said bracket is disposed at a same lateral and vertical position with respect to said predetermined, indicator part of their respective mounting portion, and
wherein a distance from the radial center of the circular part to the indicator part is identical for each bracket,
whereby centers of pipe segments respectively seated on said arched surfaces will all be disposed at a same lateral and vertical distance from said indicator part.

14. A method as in claim 13, further comprising selecting an elongated pipe having segments of differing diameter and seating said pipe in the respective pipe receiving receptacle of each said selected bracket so that the pipe extends through and between each said selected bracket and wherein a center axis of the elongated pipe is parallel to the line along which the at least one mark was applied.

15. A method of installing a piping system, comprising:
applying at least one mark to a surface along a line parallel to a desired center line path of a segment of the piping system;
selecting a plurality of pipe mounting brackets, each said pipe mounting bracket comprising:
a mounting portion including a mounting face for being disposed in opposed facing relation to a planar surface and secured thereto with at least one fastener; and
a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle,
wherein each said mounting portion includes a predetermined, indicator part disposed at a predetermined lateral and vertical position with respect to a radial center of a circular part of said arched surface of said respective bracket;
aligning said indicator part of each said selected bracket with said at least one mark and fastening each said selected bracket to said surface with at least one fastener, and after said aligning and fastening, placing an elongated pipe into the pipe receiving receptacle of each said selected pipe mounting bracket so that said elongated pipe extends between and is supported by said brackets, wherein said step of placing a pipe comprises placing a pipe having a plurality of segments of differing diameters along its length and wherein said step of selecting a plurality of pipe brackets comprises, for each said segment, selecting at least one pipe bracket which has a pipe receiving receptacle generally corresponding to an outer diameter of said segment.

16. A method of installing a piping system, comprising:

applying at least one mark to a surface along a line parallel to a desired center line path of a segment of the piping system;

selecting a plurality of pipe mounting brackets, each said pipe mounting bracket comprising:
  a mounting portion including a mounting face for being disposed in opposed facing relation to a planar surface and secured thereto with at least one fastener; and
  a pipe supporting portion projecting from said mounting portion in a plane generally perpendicular to said mounting face and including an arm portion having a generally arched surface sized and extending to support at least a portion of an outer circumferential surface of a pipe and thereby defining a pipe receiving receptacle, wherein each said mounting portion includes a predetermined, indicator part disposed at a predetermined lateral and vertical position with respect to a radial center of a circular part of said arched surface of said respective bracket;

wherein at least two of said selected brackets have arched surfaces having respectively different radii so as to be respectively adapted to receive a pipe segment of differing diameter from the other, and wherein the radial center of said arched surface of each said bracket is disposed at a same lateral and vertical position with respect to said predetermined, indicator part of their respective mounting portion, and aligning said indicator part of each said selected bracket with said at least one mark and fastening each said selected bracket to said surface with at least one fastener.

* * * * *